US009491046B2

(12) United States Patent
Jain et al.

(10) Patent No.: US 9,491,046 B2
(45) Date of Patent: Nov. 8, 2016

(54) SYSTEM AND METHOD FOR SWITCHING TRAFFIC FROM SUB-OPTIMAL PRIMARY P2MP TO STANDBY P2MP

(71) Applicants: Pradeep G Jain, Mountain View, CA (US); Kanwar D Singh, Mountain View, CA (US)

(72) Inventors: Pradeep G Jain, Mountain View, CA (US); Kanwar D Singh, Mountain View, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 210 days.

(21) Appl. No.: 13/731,285

(22) Filed: Dec. 31, 2012

(65) Prior Publication Data

US 2014/0029418 A1     Jan. 30, 2014

Related U.S. Application Data

(60) Provisional application No. 61/676,796, filed on Jul. 27, 2012.

(51) Int. Cl.

| | |
|---|---|
| *H04J 1/16* | (2006.01) |
| *H04L 12/24* | (2006.01) |
| *H04L 12/803* | (2013.01) |
| *H04L 12/751* | (2013.01) |
| *H04L 12/707* | (2013.01) |

(Continued)

(52) U.S. Cl.
CPC ....... *H04L 41/0686* (2013.01); *H04L 41/0654* (2013.01); *H04L 41/0659* (2013.01); *H04L 41/0668* (2013.01); *H04L 45/026* (2013.01); *H04L 45/22* (2013.01); *H04L 45/28* (2013.01); *H04L 45/50* (2013.01); *H04L 47/125* (2013.01); *H04L 47/724* (2013.01)

(58) Field of Classification Search
CPC .................................................... H04L 41/0654
USPC ........................................................ 370/228
See application file for complete search history.

(56) References Cited

U.S. PATENT DOCUMENTS 7,602,702 B1 * 10/2009 Aggarwal ..................... 370/217
7,948,996 B2     5/2011 Kompella (Continued)

FOREIGN PATENT DOCUMENTS

| JP | 2006157716 A | 6/2006 |
|---|---|---|
| JP | 2007312091 A | 11/2007 |

(Continued)

OTHER PUBLICATIONS

International Search Report and Written Opinion for International Application No. PCT/US2013/051697, mailed Nov. 7, 2013, Alcatel-Lucent USA Inc., Applicant, 8 pages.

(Continued)

*Primary Examiner* — Wei Zhao
(74) *Attorney, Agent, or Firm* — Tong, Rea, Bentley & Kim, LLC

(57) ABSTRACT

A system, method and apparatus in which RSVP path messages are modified to indicate that a failed source-to-leaf (S2L) sub-LSP or path has switched (or is switching) to a bypass S2L sub-LSP or path via a local-protection mechanism. Thus, a leaf PE node may choose to switch traffic sourcing from a primary tunnel to a standby tunnel even if the primary tunnel appears to be functioning properly. In this manner, any actual or potential suboptimal performance of the primary tunnel due to selection of the local-protection mechanism may be avoided.

19 Claims, 3 Drawing Sheets

(51) Int. Cl.
*H04L 12/703* (2013.01)
*H04L 12/723* (2013.01)
*H04L 12/913* (2013.01)

(56) References Cited

U.S. PATENT DOCUMENTS

| | | |
|---|---|---|
| 8,014,275 B1 | 9/2011 | Sundt et al. |
| 8,243,587 B2 | 8/2012 | Darwish |
| 8,521,896 B2 | 8/2013 | Liu |
| 8,644,325 B2 | 2/2014 | Iovanna et al. |
| 8,693,339 B2 | 4/2014 | So |
| 8,797,886 B1 | 8/2014 | Kompella |
| 8,902,780 B1 | 12/2014 | Hegde et al. |
| 8,953,590 B1 | 2/2015 | Aggarwal et al. |
| 2006/0092952 A1 | 5/2006 | Boutros et al. |
| 2006/0140111 A1 | 6/2006 | Vasseur et al. |
| 2006/0209716 A1 | 9/2006 | Previdi et al. |
| 2007/0047469 A1 | 3/2007 | Vasseur et al. |
| 2007/0070914 A1 | 3/2007 | Abigail |
| 2007/0124453 A1 | 5/2007 | Slaughter et al. |
| 2008/0069007 A1 | 3/2008 | Vasseur et al. |
| 2008/0198751 A1 | 8/2008 | Li |
| 2008/0310442 A1* | 12/2008 | Li .................... H04L 45/00 370/419 |
| 2009/0010153 A1 | 1/2009 | Filsfils et al. |
| 2009/0046723 A1 | 2/2009 | Rahman et al. |
| 2009/0135841 A1 | 5/2009 | Vasseur et al. |
| 2009/0207845 A1* | 8/2009 | Guan .................... 370/392 |
| 2009/0225652 A1 | 9/2009 | Vasseur |
| 2009/0238084 A1 | 9/2009 | Nadeau |
| 2010/0142531 A1 | 6/2010 | Kansara et al. |
| 2010/0169506 A1 | 7/2010 | Krzanowski et al. |
| 2010/0208741 A1* | 8/2010 | Vasseur ................ 370/400 |
| 2011/0090786 A1 | 4/2011 | Liu et al. |
| 2012/0027013 A1* | 2/2012 | Napierala ................ 370/390 |
| 2013/0232193 A1 | 9/2013 | Ali et al. |

FOREIGN PATENT DOCUMENTS

| WO | WO 2006/044217 A1 | 4/2006 |
|---|---|---|
| WO | WO 2009/078395 A1 | 6/2009 |
| WO | WO 2012/015582 A1 | 2/2012 |

OTHER PUBLICATIONS

Cristel Pelsser et al: "Path Selection Techniques to Establish Constrained Interdomain MPLS LPs", Jan. 1, 2006, Networking 2006. Networking Technologies, Services, and Protocols; Performance of Computer and Communication Networks; Mobile and Wireless Communications Systems Lecture Notes in Computer Science; LNCS, Springer, Berlin, DE, pp. 209-220, XP019030828, ISBN: 978-3-540-34192-5, pp. 209-220.

International Search Report and Written Opinion for International Application Serial No. PCT/US2013/050510, dated Oct. 29, 2013, consists of 8 unnumbered pages.

International Search Report and Written Opinion for International Application No. PCT/US2013/050536, mailed Nov. 13, 2013, Alcatel-Lucent USA Inc., Applicant, 8 pages.

Katz D Ward Juniper Networks D: "Bidirectional Forwarding Detection (BFD); rfc5880.txt", Bidirectional Forwarding Detection (BFD); RFC5880.TXT, Internet Engineering Task Force, IETF; Standard, Internet Society (ISOC) 4, Rue Des Falaises CH-1205 Geneva, Switzerland, Jun. 1, 2010, pp. 1-49, XP015070820, [retrieved on 96/01/2010].

Aggarwal R., et al., "Extensions to Resource Reservation Protocol—Traffic Engineering (RSVP-TE) for Point-to-Multipoint TE Label Switched Paths (LSPs); rfc4875.txt," May 1, 2005, XP015052419.

Pan P., et al., "Fast Reroute Extensions to RSVP-YE for LSP Tunnels; rfc4090.txt," May 1, 2005, XP015041909.

International Search Report and Written Opinion for International Patent Application Serial No. PCT/US2013/051793, mailed Nov. 27, 2013, consists of 8 unnumbered pages.

Aggarwai R., et al., "Extensions to Resource Resource Reservation Protocol—Traffic Engineering (RSVP-TE) for Point-to-Multipoint TE Label Switched Paths (LSPs); rfc4875.txt," May 2007, XP015052419.

Pan P., et al., "Fast Rercute Extensions to RSVP-YE for LSP Tunnels; rfc4090.txt," May 1, 2005, XP015041909.

Muley et al., "Methods for Efficient Multicast Delivery in MPLS networks," APRICOT 2010 / APNIC 29, Mar. 2010, Internet <URL: http://www.apricot.net/apricot2010/_data/assets/pdf_file/0003/18912/Operations_02_Methods-of-efficient-multicast-delivery-in-MPLS-networks_Pradeep-Jain.pdf.

* cited by examiner

SYSTEM AND METHOD FOR SWITCHING TRAFFIC FROM SUB-OPTIMAL PRIMARY P2MP TO STANDBY P2MP

CROSS-REFERENCE TO RELATED APPLICATION

This application claims the benefit of pending U.S. Provisional Patent Application Ser. No. 61/676,796, filed Jul. 27, 2012, entitled SYSTEM, METHOD AND APPARATUS FOR IMPROVED MPLS MANAGEMENT, which application is incorporated herein by reference in its entirety.

FIELD OF THE INVENTION

The invention relates to the field of communication networks such as multi-protocol label switching (MPLS) networks and, more particularly but not exclusively, to point to multipoint (P2MP) traffic path management.

BACKGROUND

Multiprotocol Label Switching (MPLS) enables efficient delivery of a wide variety of differentiated, end-to-end services. Multiprotocol Label Switching (MPLS) traffic engineering (TE) provides a mechanism for selecting efficient paths across an MPLS network based on bandwidth considerations and administrative rules. Each label switching router maintains a TE link state database with a current network topology. Once a path is computed, TE is used to maintain a forwarding state along that path.

For a dual homed Leaf node sourcing traffic from two independent P2MP trees, it is desirable to switch traffic from primary Tree to Standby Tree, when the Primary tree becomes sub-optimal due to some network event. The proposal provides a method to address the above.

SUMMARY

Various deficiencies in the prior art are addressed by systems, methods and apparatus in which RSVP path messages are modified to indicate that a failed source-to-leaf (S2L) sub-LSP or path has switched (or is switching) to a bypass S2L sub-LSP or path via a local-protection mechanism. Thus, a leaf PE node may choose to switch traffic sourcing from a primary tunnel to a standby tunnel even if the primary tunnel appears to be functioning properly. In this manner, any actual or potential suboptimal performance of the primary tunnel due to selection of the local-protection mechanism may be avoided.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
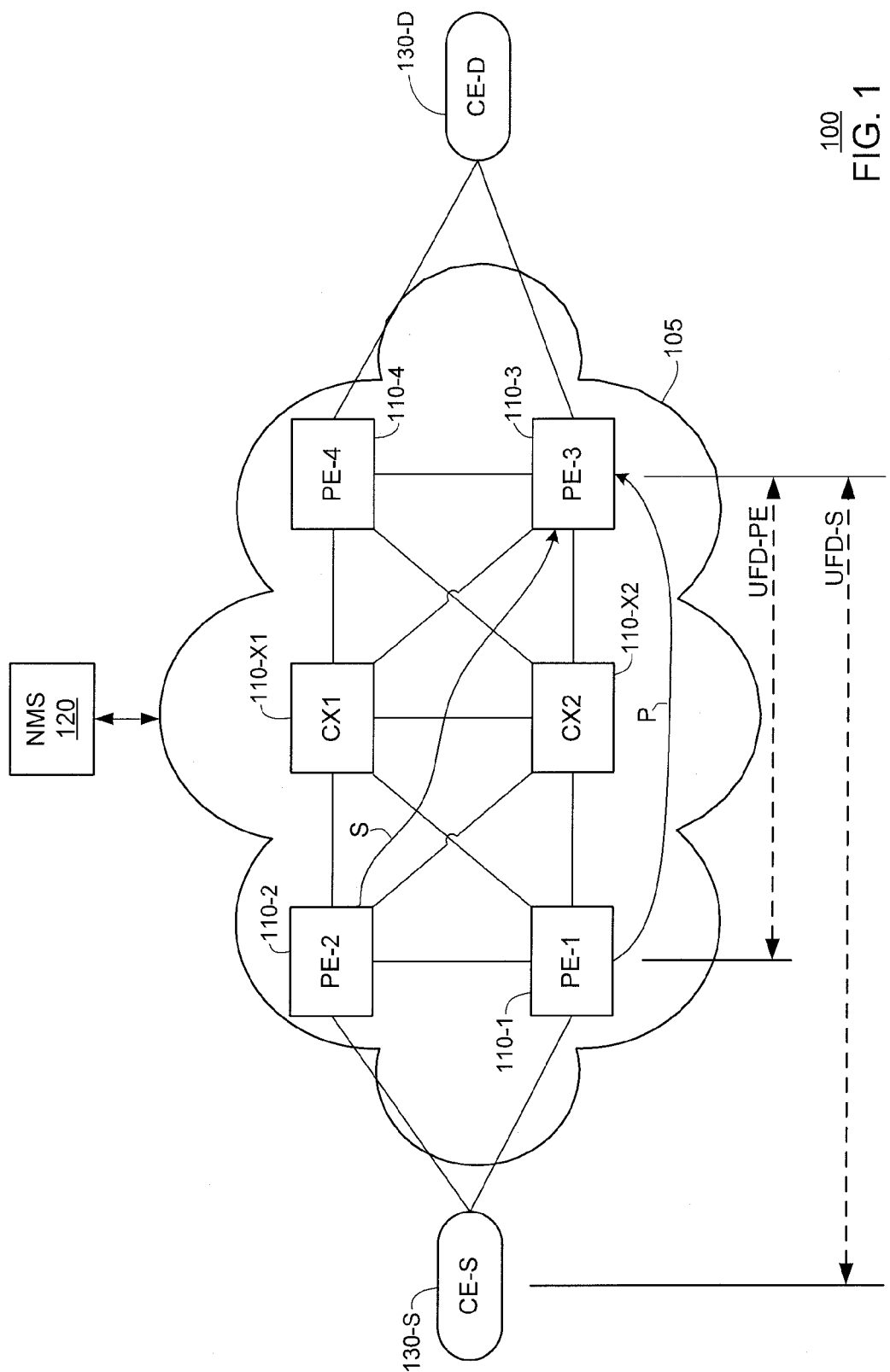
FIG. 1 depicts an exemplary network benefiting from the various embodiments.

Various embodiments will be described within the context of dual homed leaf nodes sourcing traffic from two independent Point to Multipoint (P2MP) trees in a network supporting Resource Reservation Protocol (RSVP) Inter-Domain Traffic Engineering Label Switched Paths (TE-LSPs) of type Contiguous LSP. However, it will be appreciated by those skilled in the art that the various embodiments described herein are applicable to other types of networks FIG. 1 depicts a high-level block diagram of a communication network architecture benefiting from various embodiments. Specifically, the architecture 100 of FIG. 1 provides a Multi-Protocol Label Switching (MPLS) network supporting Resource Reservation Protocol (RSVP) Inter-Domain Traffic Engineering Label Switched Paths (TE-LSPs) of type Contiguous LSP. The network may be modified by those skilled in the art to use other MPLS related protocols rather that the exemplary protocol discussed herein.

The architecture 100 includes an IP/MPLS communication network (CN) 105 and at least one network management system (NMS) 120 operative to, illustratively, route traffic between a source Customer Edge (CE) router CE-S 130-S and a destination CE router CE-D 130-D via one or both of primary and secondary label switched paths (LSPs); namely, primary path P and secondary path S.

As depicted, NMS 120 is operative to control a plurality of routers 110 forming the CN 105; namely, a plurality of Provider Edge (PE) routers 110-1 through 110-4, and a plurality of core routers 110-X1 and 110-X2. It will be noted that while only four PE routers are depicted, the CN 105 may include many more PE routers. Similarly, while only two core routers are depicted, the CN 105 may include many more core routers. The representation of the CN 105 is simplified for purposes of this discussion.

The NMS 120 is a network management system adapted for performing the various management functions described herein. The NMS 120 is adapted to communicate with nodes of CN 105. The NMS 120 may also be adapted to communicate with other operations support systems (e.g., Element Management Systems (EMSs), Topology Management Systems (TMSs), and the like, as well as various combinations thereof).

The NMS 120 may be implemented at a network node, network operations center (NOC) or any other location capable of communication with the CN 105 and various elements related thereto. The NMS 120 may support user interface capabilities to enable one or more users to perform various network management, configuration, provisioning or control related functions (e.g., enter information, review information, initiate execution of various methods as described herein and the like). Various embodiments of the NMS 120 are adapted to perform functions as discussed herein with respect to the various embodiments. The NMS 120 may be implemented as a general purpose computing device or specific purpose computing device, such as described below with respect to FIG. 3.

The NMS 120 and the various routers 110 operate to support Resource Reservation Protocol (RSVP) Inter-Domain Traffic Engineering Label Switched Paths (TE-LSPs) as described in more detail in various Internet Engineering Task Force (IETF) Request for Comment (RFC), such as RFC4726 and RFC5151.

As depicted in FIG. 1, a point to multipoint (P2MP) traffic stream (e.g., a video or other data stream) is communicated from a source Customer Edge (CE) router CE-S 130-S to a destination CE router CE-D 130-D via one or both of primary and secondary label switched paths (LSPs); namely, primary path P and secondary path S. Primary path P originates at PE 110-1, traverses the core of CN 105 and terminates at PE 110-3. Secondary path S originates at PE 110-2, traverses the core of CN 105 and terminates at PE 110-3.

Thus, PE 110-3 operates as a dual homed leaf node sourcing traffic from two independent P2MP trees; namely, a primary LSP tree originating at Root Node PE 110-1 and a secondary LSP tree originating at Root Node PE 110-2.

Each of the primary and secondary P2MP LSPs comprises multiple source-to-leaf (S2L) sub-LSPs which are set up between ingress and egress LSRs and appropriately overlaid to construct the P2MP TE LSPs. During path computation, the P2MP TE LSP may be determined as a set of S2L sub-LSPs that are computed separately and combined to give the path of the P2MP LSP, or the entire P2MP TE LSP may be determined as a P2MP tree in a single computation.

In various embodiments, each of the two tunnels includes fast reroute protection such as that described in IETF RFC 4090, May 2005, entitled "Fast Reroute Extensions to RSVP-TE for LSP Tunnels", which is incorporated herein by reference in its entirety. Generally speaking, IETF FC 4090 defines RSVP-TE extensions to establish backup label switched path (LSP) tunnels for local repair of LSP tunnels. These mechanisms enable the re-direction of traffic onto backup LSP tunnels in 10 s of milliseconds, in the event of a failure. Two methods are defined. The one-to-one backup method creates detour LSPs for each protected LSP at each potential point of local repair. The facility backup method creates a bypass tunnel to protect a potential failure point; by taking advantage of MPLS label stacking, this bypass tunnel can protect a set of LSPs that have similar backup constraints. Both methods can be used to protect links and nodes during network failure. The described behavior and extensions to RSVP allow nodes to implement either method or both and to interoperate in a mixed network.

There are two fundamental RSVP message types: RSVP reservation request (Resv) and Path message types. Receiver hosts send RSVP reservation requests (Resv) messages upstream towards the senders to create and maintain "reservation state" in each node along the path(s). RSVP sender hosts transmit RSVP Path messages downstream along unicast/multicast routes provided by the routing protocol(s), following the paths of the data. These Path messages store "path state" in each node along the way, including at least the unicast IP address of the previous hop node, which is used to route Resv messages hop-by-hop in the reverse direction.

S2L Path Failure and Restoration Indication

If a node, link or other network element associated with a S2L path along the primary tunnel or path fails, an automatic bypass procedure is initiated when the failed node (or a subsequent affected node) transmits RSVP reservation request (Resv) message upstream toward the root PE of the tunnel, which causes the root PE to trigger a rerouting of the affected S2L path via a bypass S2L path using a local-protection mechanism.

Unfortunately, the bypass procedure and/or the bypass path selected may result in suboptimal performance of the primary path or tunnel. For example, the bypass procedure may take too long (e.g., a bypass path is not readily available or re-routing takes too long), or the bypass path may have insufficient Quality of Service (QoS) guarantees.

In various embodiments, downstream RSVP path messages are modified to include error information to indicate that a failed S2L sub-LSP or path has switched (or is switching) to a bypass S2L sub-LSP or path via a local-protection mechanism.

In various embodiments, the newly defined RSVP error message includes information to indicate that a failed S2L sub-LSP or path has switched (or is switching) to a bypass S2L sub-LSP or path via a local-protection mechanism.

In one embodiment, the information within the modified downstream RSVP path messages or newly defined RSVP error message comprises a local-protection "inUse" flag that is set (or set to a first state such as "1" or some other character) to indicate to the leaf PE node or other nodes that there is use of a local-protection mechanism to bypass the affected S2L path, and reset (or set to a second state such as "0" or blank) to indicate to the leaf PE node or other nodes that the affected S2L path is no longer bypassed (i.e., the S2L path has been restored).

In one embodiment, a Record Route Object (RRO) flag within the RSVP path message is updated to indicate whether or not the RSVP session includes a bypass S2L path. Specifically, the RRO flag may be set (or set to a first state such as "1" or some other character) to indicate to the leaf PE node or other notes that the RSVP session includes at least one bypass S2L path, or reset (or set to a second state such as "0" or blank) to indicate to the leaf PE node or other notes that the RSVP session includes does not include a bypass S2L path.

The information within the modified downstream RSVP path messages or newly defined RSVP error message indicates to the leaf PE node (or subsequent nodes) that a bypass S2L path has been selected (or is in the process of being selected) via a local-protection mechanism, thereby giving the leaf PE node the opportunity to switch traffic flow sourcing from the affected tunnel (e.g., the primary path P) to the backup tunnel (e.g., a secondary path S). The decision to switch traffic flow sourcing may be made according to various system operator criteria, customer criteria, traffic-related criteria or other criteria.

Figure 2:
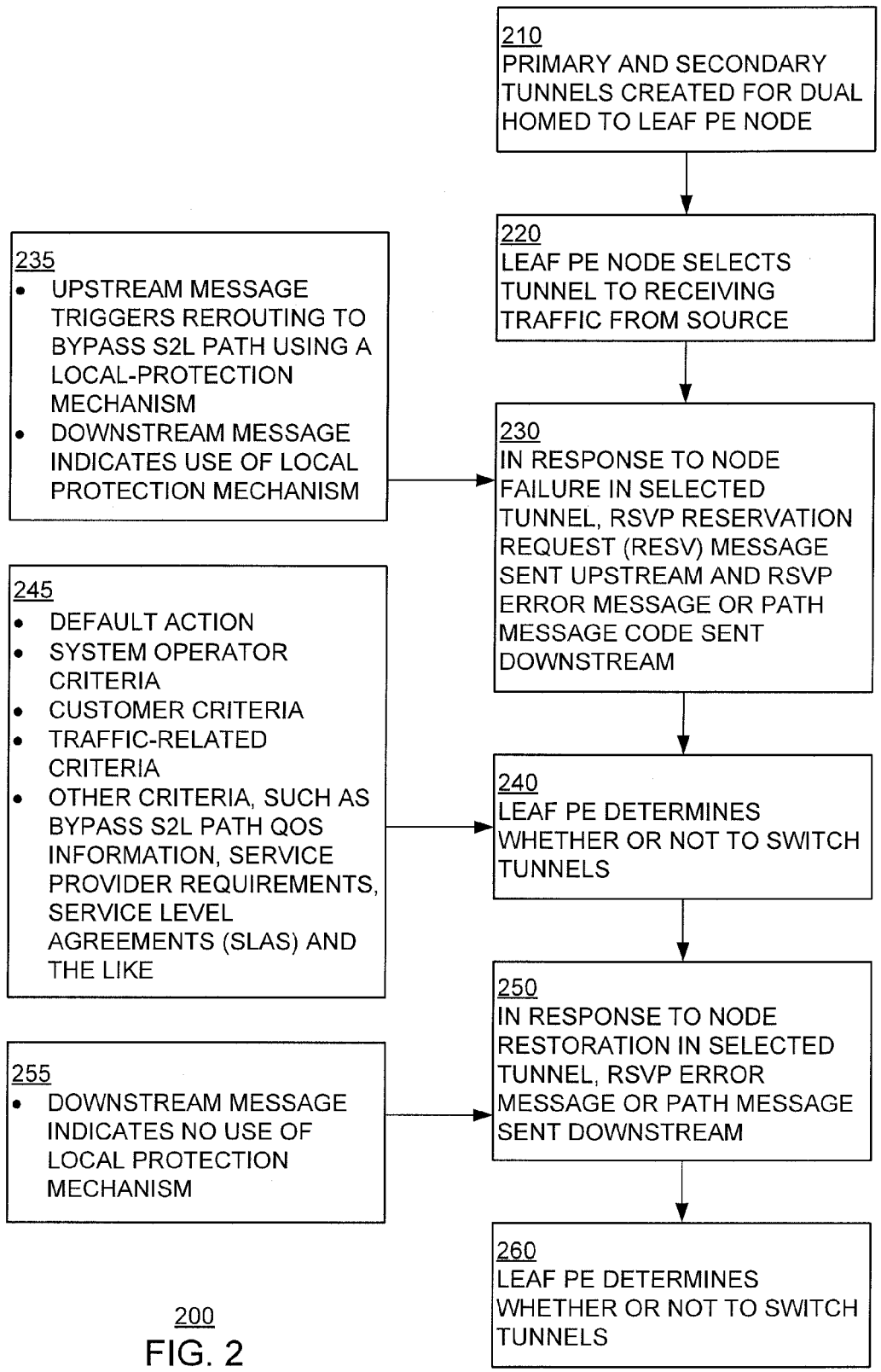
FIG. 2 depicts a flow diagram of a method according to one embodiment.

FIG. 2 depicts a flow diagram of a method according to one embodiment. Specifically, FIG. 2 depicts a method 200 in which information indicative of the use of a bypass S2L path within a RSVP session is captured and propagated downstream so that, illustratively, a dual homed leaf PE node may switch traffic flow sourcing from an affected tunnel to a backup tunnel to thereby avoid potential suboptimal service quality on the affected tunnel.

At step 210, a primary tunnel is created from a first root node to a leaf node, while a secondary tunnel is created from a second root node to the leaf node. For purposes of this discussion that will be assumed that the primary and secondary tunnels comprise, respectively, primary path P and secondary path S as discussed above with respect to FIG. 1. Video streams or other traffic from the source 130-S are mapped to both the tunnels on the root PE 110-1. Each of the two tunnels is associated with an independent P2MP tree.

At step 220, the leaf node (e.g., P in response to node failure E 110-3) selects one of the tunnels (e.g., primary path P) for receiving traffic from the traffic source (Root Node PE 110-1).

At step 230, in the event of a failure of a node along the primary tunnel or path, an automatic bypass procedure is initiated when the failed node (or a subsequent affected node) transmits (1) a RSVP reservation request (Resv) message upstream toward the root PE of the tunnel, which causes the root PE to trigger a rerouting of the affected S2L path via a bypass S2L path using a local-protection mechanism; and (2) a RSVP Error message or Path message including an appropriate error code downstream toward the leaf PE of the tunnel, such as by setting a local-protection "inUse" flag and/or RRO flag.

Specifically, information advertising the use (or termination of such use) of a local protection mechanism may be propagated via a routing protocol such as Open Shortest Path First (OSPF) routing protocol, Intermediate System To Intermediate System (IS-IS) routing protocol and the like using, illustratively, a new flag or bit setting in an existing LSP attribute or a newly defined LSP attribute encoded in Type-Length-Value (TLV) format. For example, by adapting or setting to a first state a flag or bit setting of a OSPF router info capability TLV, IS-IS router info capability TLV, other TLV, existing LSP attribute and the like.

At step 240, upon receiving the RSVP Error message or Path message of step 230, the leaf PE node makes a determination as to whether or not it should switch traffic sourcing from the affected tunnel (e.g., primary path P) to a backup tunnel (e.g., secondary path S). Referring to box 245, this determination may be a default action or determined with respect to various system operator criteria, customer criteria, traffic-related criteria or other criteria, such as bypass S2L path QoS information, service provider requirements, service level agreements (SLAs) and the like.

At step 250, in the event of the affected S2L being restored and/or re-optimized, the previously failed node (or a subsequent affected node) transmits a RSVP Error message or Path message including an appropriate error code downstream toward the leaf PE of the tunnel, such as by resetting a local-protection "inUse" flag and/or RRO flag. For example, if a global revert MBB triggers the re-optimization of the affected S2L and traffic moves back from bypass the RRO flag may be set to "0" or cleared. The leaf node may use this flag to switch back to primary P2MP Tree.

At step 260, upon receiving the RSVP Error message or Path message of step 250, the leaf PE node makes a determination as to whether or not it should switch traffic sourcing from the backup tunnel (e.g., secondary path S) to the primary tunnel (e.g., primary path P). This determination may be made using criteria so much that discussed above with respect to step 240.

In various embodiments, and especially in a rapid bypass/restoration cycle, old/erroneous data may still he propagating through the affected tunnel such that the RSVP Error message or Path message information is not accurate. In this case, the node is adapted to ignore the path message and not switch back from standby P2MP tree to Primary P2MP tree until after a predetermined time period has elapsed or some other indication of appropriate tunnel restoration is received.

In various embodiments, since the RSVP Error message or Path message can get dropped in the network, the leaf PE node supports an ability to switch from an affected primary P2MP tree to a standby P2MP tree based on the RRO flag alone.

The various methods techniques described herein enable service providers to switch traffic from a suboptimal or potentially suboptimal primary P2MP tunnel in response to a local-protection mechanism switching from a primary S2L sub-LSP or path to a secondary or bypass S2L sub-LSP.

In various embodiments, a node or LSR detecting use or imminent use of a local protection mechanism (such as a bypass S2L sub-LSP) of an LSP routed therethrough responsively informs an ingress or root PE node associated with the LSP as well as one or more egress or leaf PE nodes associated with the LSP.

New TLV Attribute

Various embodiments described herein enable the communication of use or non-use of a local protection mechanism to a root PE or other node (such as an ingress LSP, area border router and the like) and/or to a leaf PE or other node (such as a transit or egress LSP and the like) using a new flag or bit setting in an existing LSP attribute or, optionally, a newly defined LSP attribute encoded in Type-Length-Value (TLV) format.

In one embodiment, to indicate use of a local protection mechanism, one of the bits (e.g., bit 3) within an existing or newly defined LSP attribute TLV is set or cleared, such as an attribute TLV according to RFC5420.3. For example, according to RFC5420.3, attributes carried by new objects are encoded within TLVs as follows, where a Type Field is an identifier of the TLV, a Length Field is used to indicate the total length of the TLV in octets, a Value Field is used to carry the data.

Various embodiments define new flag values in the Attribute Flags TLV, which are carried in the following LSP_ATTRIBUTES Object, such as LSP_ATTRIBUTES class=197, C-Type=1.

A specific bit number (e.g., bit 3, bit 4 or some other bit) may be assigned a designation of "inUse Bit" or some other designation.

If the inUse Bit is set for a particular LSP or S2L sub-LSP, then the S2L sub-LSP may be providing a reduced Quality of Service (QOS) level such that an alternate LSP should be used by a leaf PE or other node.

If the inUse Bit is clear for a particular LSP or S2L sub-LSP, then the S2L sub-LSP is providing an initial or expected Quality of Service (QOS) level such that restoration of services on an initial LSP from a previously selected alternate LSP may be appropriate for a leaf PE or other node.

Thus, in various embodiments an indication of use or non-use of a local protection mechanism associated with a S2L sub-LSP of a LSP is provided via a LSP attribute encoded in Type-Length-Value (TLV) format.

In various embodiments, an indication of use or non-use of a local protection mechanism is communicated via additional bits in the LSP_ATTRIBUTES object.

Figure 3:
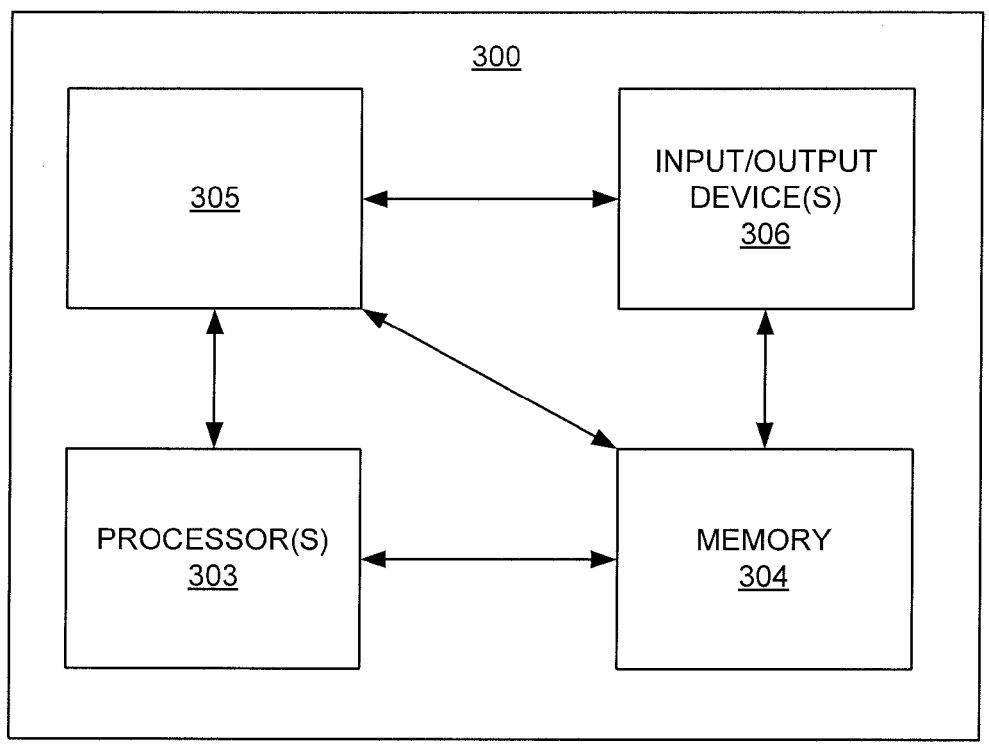
FIG. 3 depicts a high-level block diagram of a computer suitable for use in performing functions described herein.

FIG. 3 depicts a high-level block diagram of a computer suitable for use in performing functions described herein.

As depicted in FIG. 3, computer 300 includes a processor element 303 (e.g., a central processing unit (CPU) and/or other suitable processor(s)), a memory 304 (e.g., random access memory (RAM), read only memory (ROM), and the like), a cooperating module/process 305, and various input/output devices 306 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that computer 300 depicted in FIG. 3 provides a general architecture and functionality suitable for implementing functional elements described herein or portions network of the functional elements described herein.

It is contemplated that some of the steps discussed herein may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in tangible and non-transitory computer readable medium such as fixed or removable media or memory, and/or stored within a memory within a computing device operating according to the instructions.

While the foregoing is directed to various embodiments of the present invention, other and further embodiments of the invention may be devised without departing from the basic scope thereof. As such, the appropriate scope of the invention is to be determined according to the claims.

What is claimed is:

1. A method for signaling use of a local protection mechanism associated with a label switched path (LSP) supporting a resource reservation protocol (RSVP) Session, the method comprising:
    in response to said LSP supporting said RSVP Session switching from a primary source-to-leaf (S2L) sub-LSP to a bypass S2L sub-LSP based on use of said local protection mechanism:
        generating an upstream RSVP Resv error message configured to trigger a rerouting of said LSP at a root provider edge (PE) node; and
        propagating a RSVP Path message downstream toward a leaf PE node to advertise the use of the local protection mechanism to the leaf PE node.

2. The method of claim 1, wherein said LSP comprises one of a plurality of point to multipoint (P2MP) LSPs, wherein said RSVP Path message is configured to cause said leaf PE node to switch to a different P2MP LSP.

3. The method of claim 1, wherein said LSP comprises one of a plurality of point to multipoint (P2MP) LSPs, wherein said RSVP Path message is configured to cause said leaf PE node to switch to a different P2MP LSP in accordance with one or more of system operator criteria, customer criteria, or traffic-related criteria.

4. The method of claim 1, wherein said LSP comprises one of a plurality of point to multipoint (P2MP) LSPs, wherein said RSVP Path message is configured to cause said leaf PE node to switch to a different P2MP LSP in accordance with bypass S2L sub-LSP quality of service (QOS) criteria.

5. The method of claim 1, wherein said LSP comprises one of a plurality of point to multipoint (P2MP) LSPs, wherein said RSVP Path message is configured to cause said leaf PE node to switch to a different P2MP LSP in accordance with a service level agreement (SLA).

6. The method of claim 1, further comprising:
    in response to said primary S2L sub-LSP being restored, generating a downstream RSVP Path message configured to indicate to said leaf PE node that the primary S2L sub-LSP has been restored.

7. The method of claim 6, wherein said LSP comprises one of a plurality of point to multipoint (P2MP) LSPs, wherein said downstream RSVP Path message is configured to cause said leaf PE node to switch to said LSP.

8. The method of claim 7, wherein said LSP comprises one of a plurality of point to multipoint (P2MP) LSPs, wherein said downstream RSVP Path message is configured to cause said leaf PE node to switch to said LSP in accordance with one or more of system operator criteria, customer criteria, traffic-related criteria, or bypass S2L sub-LSP quality of service (QOS) criteria.

9. The method of claim 7, wherein said LSP comprises one of a plurality of point to multipoint (P2MP) LSPs, wherein said downstream RSVP Path message is configured to cause said leaf PE node to switch to said LSP in accordance with a service level agreement (SLA).

10. The method of claim 1, wherein the switching of the LSP from the primary S2L sub-LSP to the bypass S2L sub-LSP is detected by a label switched router (LSR) supporting said LSP based on monitoring of the primary S2L sub-LSP.

11. The method of claim 1, wherein said RSVP Path message is propagated downstream via a routing protocol associated with the LSP.

12. The method of claim 11, wherein said routing protocol comprises one of an Open Shortest Path First (OSPF) routing protocol or an Intermediate System To Intermediate System (IS-IS) routing protocol.

13. The method of claim 1, wherein the use of the local protection mechanism is advertised via a LSP_ATTRIBUTES object encoded in Type-Length-Value (TLV) format.

14. The method of claim 13, wherein a state of a predefined bit of the LSP_ATTRIBUTES object is used to indicate the use of the local protection mechanism.

15. The method of claim 13, wherein said LSP_ATTRIBUTES object comprises one or more bits associated with the use of said local protection mechanism.

16. The method of claim 1, wherein the use of said local protection mechanism is advertised to said leaf PE node using a Record Route Object (RRO) flag within said RSVP Path message.

17. An apparatus configured to signal use of a local protection mechanism associated with a label switched path (LSP) supporting a resource reservation protocol (RSVP) Session, the apparatus comprising:
    a processor and a memory communicatively connected to the processor, the processor configured to:
        in response to said LSP supporting said RSVP Session switching from a primary source-to-leaf (S2L) sub-LSP to a bypass S2L sub-LSP based on use of said local protection mechanism:
            generate an upstream RSVP Resv error message configured to trigger a rerouting of said LSP at a root provider edge (PE) node; and
            propagate a RSVP Path message downstream toward a leaf PE node to advertise the use of the local protection mechanism to the leaf PE node.

18. A non-transitory computer-readable storage medium storing instructions which, when executed by a computer, cause the computer to provide a method for signaling use of a local protection mechanism associated with a label switched path (LSP) supporting a resource reservation protocol (RSVP) Session, the method comprising:
    in response to said LSP supporting said RSVP Session switching from a primary source-to-leaf (S2L) sub-LSP to a bypass S2L sub-LSP based on use of said local protection mechanism:
        generating an upstream RSVP Resv error message configured to trigger a rerouting of said LSP at a root provider edge (PE) node; and
        propagating a RSVP Path message downstream toward a leaf PE node to advertise the use of the local protection mechanism to the leaf PE node.

19. A non-transitory computer program product comprising instructions which, when processed by a computer, adapt an operation of the computer to provide a method for signaling use of a local protection mechanism associated with a label switched path (LSP) supporting a resource reservation protocol (RSVP) Session, the method comprising:

in response to said LSP supporting said RSVP Session switching from a primary source-to-leaf (S2L) sub-LSP to a bypass S2L sub-LSP based on use of said local protection mechanism:
  generating an upstream RSVP Resv error message configured to trigger a rerouting of said LSP at a root provider edge (PE) node; and
  propagating a RSVP Path message downstream toward a leaf PE node to advertise the use of the local protection mechanism to the leaf PE node.

* * * * *